Oct. 27, 1953 W. H. EPPERSON 2,657,362

IMPEDANCE MATCHING NETWORK

Filed May 15, 1951

INVENTOR.
WILLIAM H. EPPERSON
BY
Campbell, Brumbaugh, Free & Graves
ATTORNEYS

Patented Oct. 27, 1953

2,657,362

UNITED STATES PATENT OFFICE 2,657,362

IMPEDANCE MATCHING NETWORK

William H. Epperson, Coral Gables, Fla., assignor to Aeronautical Communications Equipment, Inc., Miami, Fla., a corporation of Florida Application May 15, 1951, Serial No. 226,517

7 Claims. (Cl. 333—32)

This invention relates to impedance matching networks and, more particularly, to apparatus having a single unified control of the variable reactive elements by means of which the impedances are matched.

Impedance matching networks are known wherein the controls of the variable reactive elements in the impedance matching arrangement are so geared together that one element goes through its range of variation several times while another element goes through its range only once. Such an arrangement permits all the controls to be actuated by rotation of a single drive shaft and is particularly useful in automatic antenna tuning systems such as are employed with aircraft radio transmitters.

The present invention primarily resides in a network capable of matching a relatively constant impedance to a variable impedance throughout a broad range of frequencies. The network has a first variable capacitive voltage divider connected between the relatively constant impedance and ground potential. A variable inductor is connected between an intermediate capacitance point on the first voltage divider and the high impedance side of a second variable capacitive voltage divider. The second voltage divider has its low impedance side at ground potential and has an intermediate capacitance point connected to the variable impedance. The reactances of the inductor and of the capacitive voltage dividers are simultaneously variable at different speeds under a unified control to effect the impedance match. It is, of course, immaterial which way power flows through the network and, accordingly, the relatively constant impedance may be either a source or a load.

In order that the invention may be more clearly understood, it will now be described in detail with reference to the accompanying drawing wherein.

Figures 1, 2, 3:
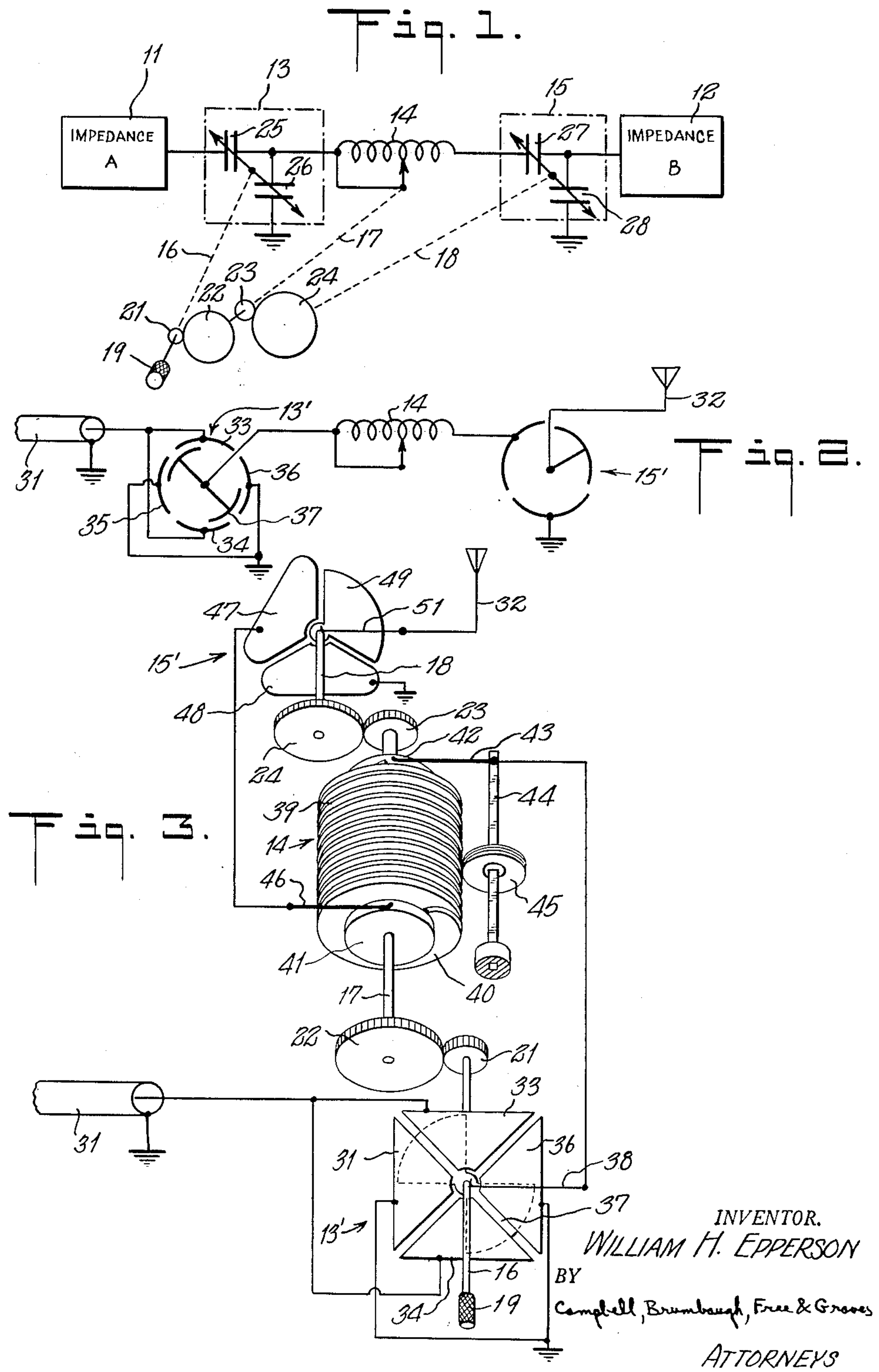
Fig. 1 is a schematic circuit diagram of the novel impedance matching network.
Fig. 2 is a schematic circuit diagram of an embodiment of the invention particularly adapted for matching the impedance of a transmission line to an antenna.
Fig. 3 is a schemtic drawing of the mechanical form of the impedance matching network shown in Fig. 2.

Referring now to Fig. 1, a substantially constant impedance 11 is coupled to an independently variable impedance 12 by means of an impedance matching network comprising a variable capacitive voltage divider 13, a variable inductor 14, and a second variable capacitive voltage divider 15 connected in a "Pi" or L configuration. The adjustable portions of reactive elements 13, 14 and 15 are controlled by shafts 16, 17 and 18, respectively. A unified control member 19, which is here shown as a manual knob, is mounted on shaft 16 for the purpose of directly controlling the varaible capacitive voltage divider 13. A pinion 21 fixed to shaft 16 meshes with a gear 22 attached to shaft 17. A pinion 23 on shaft 17 likewise engages gear 24 on shaft 18. This gearing arrangement permits variation of all three variable reactive elements 13, 14, 15 at different speeds by rotation of member 19.

A unified control of this type is particularly adapted to be motor-driven in response to an impedance sensitive circuit which produces an error signal in the presence of a mismatch. This error signal is reduced to zero when the impedance matching network is correctly adjusted. Such automatic systems have found application in tuning an antenna to a radio transmitter and per se form no part of the present invention.

Capacitive voltage divider 13 may be formed with conventional air capacitors 25 and 26 connected in series between impedance 11 and ground potential with their rotors mechanically coupled 180° out of phase. The inductor 14 has one of its terminals connected to the common junction of capacitors 25 and 26. The capacitive voltage divider 15 may be generally similar to voltage divider 13 may comprise variable capacitors 27 and 28 connected in series between the second terminal of inductor 14 and ground potential. The common junction between capacitors 27 and 28, i. e. the intermediate capacitance point on voltage divider 15, is connected to impedance 12. Impedances 11 and 12 may be source and load impedances, respectively, or vice versa.

In operation of the impedance matching network, capacitive voltage divider 13 passes through the complete cycle of its reactance values from minimum to maximum and again to minimum a large number of times while the inductor is adjusted once over its range of inductance. Capacitive voltage divider 15 passes through its range of reactance values an intermediate number of times corresponding approximately to the square root of the cycles performed by voltage divider 13. The precision of adjustment is substantially proportional to the speed ratio of the different reactive elements and the highest practical value is usually selected. It is to be observed that the wide range of impedance matching performed by the network is largely due to the differential action of the capacitive voltage dividers 13 and 15. When series capacitor 25 or 27 is maximum, the associated shunt capacitor 26 or 28 is at a minimum. Impedance 11 tends to be partially decoupled from inductor 14 by capacitor 25 at the same time that the shunting effect of capacitor 26 is at a maximum (condition for minimum coupling to the inductor 14).

Figs. 2 and 3 disclose a form of the impedance matching network which is particularly suitable for matching a radio transmission line 31 to an antenna 32. Capacitive voltage divider 13′ here takes the form of a differential butterfly type of air capacitor consisting of four stator plate assemblies 33, 34, 35 and 36 each covering a sector of slightly less than 90° and a rotor 37 having two oppositely disposed plate assemblies each also covering a sector of slightly less than 90°. Opposite stator assemblies are connected together electrically, stators 33 and 34 being attached to the transmission line 31 while stators 35 and 36 are grounded. The rotor 37 is insulated from ground and connected by a wiper arm 38 to one end of the inductor 14. It is to be noted that with each rotation of shaft 16 the capacitive voltage divider 13′ passes through two complete variations of its capacitance. Also the rotor assemblies are mechanically balanced with the result that the butterfly type of rotor can be turned at half the speed of the voltage divider 13 in Fig. 1 for the same number of capacitance changes and with less vibration.

A suitable construction of inductor 14 is shown in Fig. 3 wherein a cylindrical coil form 40 is carried on shaft 17. A helical coil 39 is wound in a threaded groove in form 40 and has its ends electrically connected to slip rings 41 and 42 concentric with and insulated from shaft 17. A brush 43 makes resilient sliding contact between slip ring 42 and a shaft 44 on which is slidably mounted a roller wiper 45. Roller wiper 45 is adapted to make rolling electrical contact between a turn of coil 39 and shaft 44 while sliding axially along shaft 44 as the coil form 40 is rotated on shaft 17. This construction is well known and does not per se form a part of the invention. A variometer would be a satisfactory substitute for roller coil 39 except for the fact that its inductance range is more limited. A brush 46 contacting slip ring 41 serves to connect inductor 14 to capacitive voltage divider 15′.

The capacitive voltage divider 15′ comprises two stator plate assemblies 47 and 48 and a rotor plate assembly 49, each assembly including a sector of slightly less than 120°. Stator assembly 47 is connected by way of brush 46 to inductor 14 while stator assembly 48 is placed at ground potential. Rotor assembly 49 is connected by means of a brush 51 to the antenna 32. It is to be noted that as the rotor assembly is turned the capacitance of voltage divider 15′ is varied between the output end of the variable inductor 14 and the antenna 32 and also is varied between antenna 32 and ground. While one of these capacitances is diminishing the other is increasing and vice versa. This arrangement provides a continuous and smooth transfer of the impedance matching network from a "Pi" circuit to an L circuit.

The sectors covered by the stator and rotor plate assemblies in capacitive voltage divider 15′ are chosen to provide the maximum capacitance between the rotor and each of the stators and between the rotor and both of the stators and at the same time to achieve the lowest minimum distributed capacitance between the rotor and one stator. It is believed that these conditions are most nearly met when the sectors of all the plate assemblies are slightly less than 120°.

In one practical embodiment of the invention a transmission line having a characteristic impedance of 52 ohms was matched to an antenna over a wide range of frequencies where the resistive component varied from about 2 ohms to about 25,000 ohms and with its normal reactive variation. In this particular impedance matching network, the three variable reactive elements were so geared together that while the variable inductor 14 was adjusted from minimum to maximum inductance, the capacitive voltage divider 15′ passed through 15 cycles and the capacitive voltage divider 13′ passed through 600 cycles. The speed ratio of voltage divider 15′ differed from its theoretically optimum value in order to compensate in a practical manner for the nonlinear variation of inductance of the inductor 14. The inductor comprised 30 turns of wire and thus made one complete change of inductance for 30 revolutions of its shaft 17. Accordingly, the ratio between gears 21 and 22 was 10:1 and the ratio between gears 23 and 24 was 2:1. A standing wave ratio of 1.2 to 1 or better was attained under these conditions. A closer impedance match could be achieved if a higher speed ratio were employed between the three reactive elements.

I claim:

1. An impedance matching network for matching a first impedance to a second impedance comprising a first variable capacitive voltage divider connected between the first impedance and ground potential, a two-terminal variable inductor having one terminal connected to an intermediate capacitance point on said first voltage divider, a second variable capacitive voltage divider connected between the second terminal of said inductor and ground potential, said second impedance being connected to an intermediate capacitance point on said second voltage divider, and means for simultaneously varying the reactances of said inductor and said capacitive voltage dividers at different speeds to effect an impedance match.

2. An impedance matching network for matching a substantially constant impedance to an independently variable impedance comprising a first variable capacitive voltage divider connected between the constant impedance and ground potential, a two-terminal variable inductor having one terminal connected to an intermediate capacitance point on said first voltage divider, a second variable capacitive voltage divider connected between the second terminal of said inductor and ground potential, said variable impedance being connected to an intermediate capacitance point on said second voltage divider, and means for simultaneously varying the reactance of said first capacitive voltage divider at a greater speed than the reactance of said second capacitive voltage divider and the reactance of said second capacitive voltage divider at a greater speed than the reactance of said inductor.

3. An impedance matching network for matching a first impedance to a second impedance comprising a variable input capacitor having an assembly of rotor plates meshable with two insulated assemblies of stator plates, one stator assembly being connected to ground potential and the other stator assembly being connected to the first impedance, a two-terminal variable inductor having one terminal connected to said rotor assembly, a variable output capacitor having an assembly of rotor plates meshable with two insulated assemblies of stator plates, one stator assembly being connected to the second terminal of said inductor and the other stator assembly being connected to ground potential, the second impedance being connected to said rotor assembly, and means for simultaneously varying the reactances of said inductor and said capacitors at different speeds to effect an impedance match.

4. An impedance matching network for matching a substantially constant impedance to an independently variable impedance comprising a variable input capacitor having an assembly of rotor plates meshable with two insulated assemblies of stator plates, one stator assembly being connected to ground potential and the other stator assembly being connected to the constant impedance, a two-terminal variable inductor having one terminal connected to said rotor assembly, a variable output capacitor having an assembly of rotor plates meshable with two insulated assemblies of stator plates, one stator assembly being connected to the second terminal of said inductor and the other stator assembly being connected to ground potential, the variable impedance being connected to said rotor assembly, and means for simultaneously varying the reactance of said inductor slowly, said output capacitor more quickly and said input capacitor the quickest to effect an impedance match.

5. An impedance matching network according to claim 4 wherein the rotor and stator plate assemblies of the output capacitor cover sectors of slightly less than 120°.

6. An impedance matching network according to claim 4 wherein the stator plate assemblies of the input capacitor cover sectors of slightly less than 90° and the rotor plate assembly of said input capacitor covers two oppositely disposed sectors of slightly less than 90°.

7. An impedance matching network according to claim 6 wherein the rotor and stator plate assemblies of the output capacitor cover sectors of slightly less than 120°.

WILLIAM H. EPPERSON.

References Cited in the file of this patent

UNITED STATES PATENTS

| Number | Name | Date |
|---|---|---|
| 2,498,078 | Harrison | Feb. 21, 1950 |

FOREIGN PATENTS

| Number | Country | Date |
|---|---|---|
| 849,954 | France | Aug. 28, 1939 |
| 514,298 | Great Britain | Nov. 6, 1939 |